United States Patent Office 3,699,103
Patented Oct. 17, 1972

---

3,699,103
PROCESS FOR THE MANUFACTURE OF 5-DESOXY-L-ARABINOSE AND NOVEL INTERMEDIATES
Joseph Kiss, Basel, Switzerland, assignor to Hoffmann-La Roche Inc., Nutley, N.J.
No Drawing. Filed Oct. 7, 1970, Ser. No. 78,912
Int. Cl. C07c 47/18
U.S. Cl. 260—210 R
14 Claims

ABSTRACT OF THE DISCLOSURE

A multi-step, stereo-specific synthesis of 5-desoxy-L-arabinose from the readily available and inexpensive starting materials D-glucose or D-xylose is disclosed. 5-desoxy-L-arabinose is a known building block for the manufacture of biopterin, a naturally occurring material having uses as a growth factor, an antioxidant, and as a precursor for co-factors of enzymes leading to the production of valuable amino acids such as phenylalanine, tryptophan and L-dopa. L-dopa is a valuable medicament which has recently been licensed in this country for use in the treatment of Parkinson's disease.

BRIEF DESCRIPTION OF THE INVENTION

The present invention relates to a multi-step, stereo-specific synthesis of 5-desoxy-L-arabinose and of novel intermediates. This process utilizes the readily available and inexpensive starting materials D-glucose or D-xylose and proceeds in high yields. This is in contrast to the previously reported synthesis of 5-desoxy-L-arabinose proceeding from the rare sugar L-rhamnose.

A major aspect of this invention concerns the preparation of 5-desoxy-L-arabinose (I)

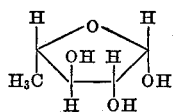

from the novel exomethylene compound II

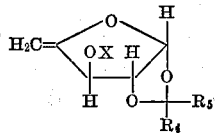

in which X represents hydrogen, lower alkyl, lower cycloalkyl, phenyl lower alkyl, lower alkanoyl, phenyl lower alkanoyl or the group $R_1OCR_2R_3$— wherein $R_1$ independently is lower alkyl, lower cycloalkyl, or phenyl lower alkyl, $R_2$ independently is hydrogen, lower alkyl, lower cycloalkyl or phenyl lower alkyl, and $R_1$ and $R_2$ taken together are lower alkylene; $R_3$ is hydrogen, lower alkyl or lower cycloalkyl; and $R_4$ and $R_5$ each independently are hydrogen, lower alkyl, lower cycloalkyl or phenyl lower alkyl or taken together are lower alkylene.

As used throughout the specification and the appended claims, the term "lower alkyl" denotes a monovalent saturated radical consisting solely of carbon and hydrogen and having from 1 to 8 carbon atoms; the term "cycloalkyl group" denotes a monovalent, monocyclic saturated radical consisting solely of carbon and hydrogen having from 3 to 8 carbon atoms in the ring and having the valence bond from one of the ring carbons; the term "lower alkanoyl group" denotes a group consisting of the residue of an alkyl monocarboxylic acid having from 1 to 8 carbon atoms formed by removal of the hydroxyl portion of the carboxyl group; and the term "lower alkylene group" denotes a divalent saturated group consisting only of carbon and hydrogen having from 1 to 8 carbon atoms. In compounds where $R_1$ and $R_2$ taken together represent a lower alkylene, this group preferably consists of 3 or 4 carbon atoms. In compounds where $R_4$ and $R_5$ taken together represent a lower alkylene group, this group preferably consists of 4 or 5 carbon atoms. Examples for the group $R_1OCR_2R_3$— are methoxy methyl, 1-ethoxy-ethyl, 1-isopropoxy-ethyl, 1-methoxy-1-methyl-ethyl, tetrahydrofuran-2-yl, 2-methyl-tetrahydrofuran-2-yl, tetrahydropyran-2-yl.

The compound of Formula II can, for example, be manufactured starting from D-glucose. In the first step, D-glucose is reacted in a conventional manner with a carbonyl compound $R_4COR_5$, where $R_4$ and $R_5$ are as above.

Carbonyl compounds that can be used are, for example, formaldehyde, acetaldehyde, acetone, methyl ethyl ketone, methyl isobutyl ketone, cyclohexanone, cyclopentanone, etc. Acetone is preferred as a reactant in this step. The reaction is preferably carried out in the presence of a dehydrating agent, for example, anhydrous copper sulfate or concentrated sulfuric acid. The reaction may be conducted in the presence of an organic solvent, although, preferably the carbonyl compound used as the reactant can be present in excess and serve as the solvent medium. The reaction proceeds readily at room temperature and there is obtained a compound of the formula

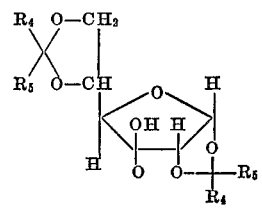

where $R_4$ and $R_5$ are as above.

The protecting group in the 5,6-O-position can be subsequently selectively cleaved by, for example, heating with copper (II) acetate in aqueous solution or by cautious heating with a dilute mineral acid or a lower alkyl carboxylic acid, preferably in an aqueous medium. If one uses an acid, the progress of the reaction is continuously monitored (e.g., with the use of thin layer chromatography) and interrupted when the protecting group in the 5,6-O-position has been cleaved off but the protecting group in the 1,2-O-position is still intact. This affords a compound of Formula IV

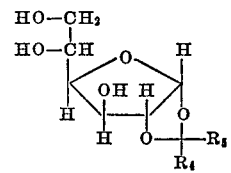

where $R_4$ and $R_5$ are as above.

The 1,2-O-protected α-D-glucofuranose obtained (IV) is then subjected to a glycol oxidation procedure. In this oxidation, the hydroxy methyl group (carbon 6) is cleaved. The oxidation is carried out with the aid of one of the conventional glycol oxidation agents, for example, lead tetraacetate, red lead and acetic acid, lead tetraphosphate, silver carbonate or an alkali metal periodate such as sodium periodate. The oxidation is conveniently carried out in an organic solvent such as acetic acid or benzene at a temperature between about room temperature and 50° C. This affords a compound of structure V.

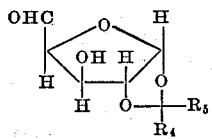

where $R_4$ and $R_5$ are as above.

The oxidation product (V) is subsequently reduced. Suitable reducing agents include complex metal hydrides, e.g. lithium aluminum hydride, sodium aluminum hydride, sodium borohydride and metal catalyzed hydrogen. A preferred method of reduction consists of hydrogenation in the presence of a Raney-nickel catalyst. This reduction is conveniently effected in an organic solvent, preferably a lower alkanol or an aqueous lower alkanol at a temperature of from about 0° to about 100° C. The hydrogenation is preferably carried out under pressure, for example, in a pressure range from 1 to about 60 atmospheres. In this manner, there is obtained a compound of the Formula VI

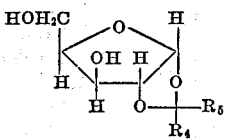

where $R_4$ and $R_5$ are as above.

The compound of Formula VI can also be prepared starting from D-xylose in an analogous manner to that shown above for the reaction sequence starting with D-glucose.

The compound of Formula VI is subsequently reacted with a substituted sulfonyl halide, for example, a lower alkyl or aryl sulfonyl chloride or bromide, e.g. methane sulfonyl chloride, p-toluene sulfonyl chloride, or p-bromo benzene sulfonyl chloride. This reaction is conveniently undertaken in a basic organic solvent such as, for example, pyridine. The reaction is carried out at a temperature between about 0° C. and room temperature and there is obtained a compound of the Formula VII

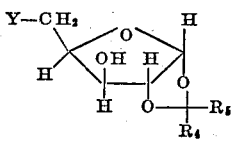

where $R_4$ and $R_5$ are as above and Y is a substituted sulfonyloxy group.

The 3-O-position of compound of Formula VII is now protected to afford a compound of the Formula VIII

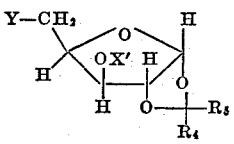

where Y, $R_4$ and $R_5$ are as above and X' is lower alkyl, lower cycloalkyl, phenyl lower alkyl, lower alkanoyl, phenyl lower alkanoyl or the group $R_1OCR_2R_3R$—, where $R_1$, $R_2$ and $R_3$ are as above.

The introduction of the protecting group is done in a manner known per se. Lower alkanoyl or phenyl lower alkanoyl groups are introduced, for example by reaction with a corresponding acid halide or acid anhydride in a basic organic solvent, such as pyridine at a temperature between about 0° and room temperature. When $R_1$ and $R_2$ are taken together in the group $R_1OCR_2R_3$—, such group may be introduced by reaction with excess of the corresponding cyclic ether, e.g. dihydropyran or dihydrofuran in an inert non-polar solvent, such as benzene or ether. The reaction is accelerated by catalytic amounts of a strong acid, such as for example p-toluene sulfonic acid. The temperature is not critical and it is convenient to perform the reaction between about room temperature and the boiling point of the reaction medium. When $R_1$ and $R_2$ are taken independently in the group $R_1OCR_2R_3$—, such group can be introduced by reaction with the corresponding halogenated ether, for example, methoxy methyl chloride or 1-ethoxy ethyl bromide in the presence of anhydrous sodium carbonate and an inert solvent at elevated temperature, preferably at the reflux point of the reaction medium. Lower alkyl, lower cycloalkyl or phenyl lower alkyl groups are conveniently introduced by the addition of the corresponding halides, e.g. methyl iodide, cyclopropyl iodide, phenethyl iodide. A large excess of the halide is added and the mixture, after the addition of powdered potassium hydroxide, is heated to a temperature of between about 80° and 150° C. In the case of the introduction of the benzyl group, benzyl chloride or benzyl bromide are preferred instead of benzyl iodide.

The compounds of Formula VIII can be transformed to the important intermediate of Formula II in two different ways. Where X' is lower alkanoyl or phenyl lower alkanoyl, the compounds of Formula II are obtained via a 5-iodo or 5-bromo compound. This is done by heating a compound of Formula VIII, where X' represents lower alkanoyl or phenyl lower alkanoyl, with an alkali metal or ammonium or substituted ammonium iodide or bromide in a lower aliphatic ketone, preferably at reflux temperature. If a volatile ketone such as acetone is used as the solvent, it is preferred to carry out the reaction in an autoclave so that the temperature can be kept in the range of about 100° to about 150° C. In this manner there is obtained a compound of the Formula IX

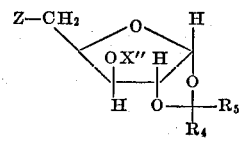

where $R_4$ and $R_5$ are as above, Z is bromine or iodine and X" is lower alkanoyl or phenyl lower alkanoyl. This compound is then converted to the desired compound II where X is lower alkanoyl or phenyl lower alkanoyl by treatment with silver fluoride. The reaction is carried in an anhydrous basic solvent, such as pyridine, preferably at about room temperature.

If desired, the protecting lower alkanoyl or phenyl lower alkanoyl group can be cleaved by treatment with a catalytic amount of an alkali metal alcoholate of a lower alkanol, dissolved in a lower alkanol, for example, a methanolic sodium methylate solution. The cleavage of the protecting group can also be accomplished by treatment with anhydrous ammonia in a lower alkanol. The reaction is conveniently carried out at a temperature between about 0° C. and room temperature. In this manner, a compound of Formula II where X is hydrogen is obtained.

Compounds of Formula VIII where X' is lower alkyl, lower cycloalkyl, phenyl lower alkyl or the group $$R_1OCR_2R_3—$$

can be directly converted into the desired compound of Formula II where X is lower alkyl, lower cycloalkyl, phenyl lower alkyl or the group $R_1OCR_2R_3$—. This reaction can be carried out by treating said compound of Formula VIII with an alkali metal alcoholate of a lower alkanol in the presence of a mixture of a lower alkanol and a basic organic solvent for example, pyridine, at about room temperature. Potassium tert.-butylate in tert.-butanol is especially preferred.

An important step of the present reaction scheme is the hydrogenation of compounds of Formula II to afford compounds of Formula X

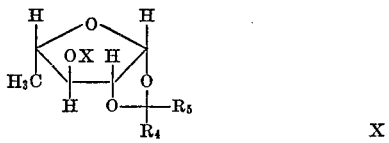

where $R_4$, $R_5$ and X are as above.

Surprisingly, this reaction proceeds stereo-specifically to afford only the compound having the desired stereochemistry at the 4-position. The reaction is conveniently carried out by treatment of compound II with hydrogen in the presence of a metal-comprising catalyst, particularly metals of Group VIII of the Periodic Table which can be supported on conventional catalyst carrier materials. Suitable hydrogenation catalysts which can be used, for example, include palladium, platinum dioxide or Raney-nickel. Palladium-charcoal is preferred as the hydrogenation catalyst. The hydrogenation is conveniently carried out at atmospheric pressure although pressure is not critical, in a non-acidic organic solvent, for example, in a lower alkanol, a lower alkyl ester of a lower alkane carboxylic acid, such as ethyl acetate, or a lower aliphatic or alicyclic ether, such as diethyl ether, tetrahydrofuran or dioxane. The reaction temperature is not critical, but it is convenient to carry out the reaction in the temperature range between about room temperature and 100° C.

In compounds where the protective group X is $R_1OCR_2R_3$— or a benzyl group, the group can be cleaved by a continuation of the above-described hydrogenation past the point where the hydrogen uptake indicates that the double bond has been saturated. For the cleavage of a benzyl group there is preferably employed platinum dioxide or palladium black in a polar solvent, such as a lower alkanol or acetic acid at a temperature between about room temperature and 100° C.

5-desoxy-L-arabinose can then be obtained by removing the protecting group present in compound X. Where the protecting group X represents lower alkanoyl or phenyl lower alkanoyl, it can be removed in the same manner as stated above for its removal from compound II. In so doing, the group

is retained and can be subsequently removed by treatment with acidic reagents, for example, by heating with a dilute mineral acid or with a lower alkane carboxylic acid in an organic solvent, for example, a lower alkanol or an aqueous lower alkanol. Where the protecting group X represents the group $R_1OCR_2R_3$—, this group can be cleaved under the above-described reaction condition for cleavage of the group

Where the protecting group X is lower alkyl, lower cycloalkyl or phenyl lower alkyl, more vigorous conditions are needed for the cleavage. This involves, for example, heating with a dilute mineral acid for an extended time or at an elevated temperature. If milder reaction conditions are used, for example, shorter reaction times or lower alkane carboxylic acids, intermediate compounds of Formula XI

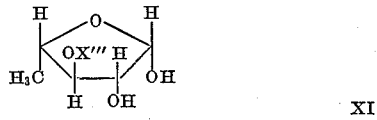

where X''' is lower alkyl, lower cycloalkyl or phenyl lower alkyl are isolated.

5-desoxy-L-arabinose is a known valuable building block for the manufacture of biopterin. Biopterin is a naturally occurring material isolated from human urine which has been shown to be a growth factor for the protozoan *Crithidia faciculata*. Biopterin and its derivatives are also useful as antioxidants for edible materials such as foodstuffs, animal feeds, vitamin preparations and the like. Biopterin and its derivatives are known precursors for the co-factor of the animal enzyme phenylalanine hydroxylase and tryptophan hydroxylase, and thus, are valuable for the preparation of these two essential amino acids. Biopterin also enhances the production of L-dopa in the body. L-dopa has recently become very important in view of the discovery that it is a very effective preparation in the treatment of Parkinson's disease. This is illustrated by its recent licensing for sale in this country for use in the treatment of this crippling malady.

The following examples are illustrative. All temperatures are in degrees centigrade.

EXAMPLE 1

6 g. of 3-O-acetyl-5-desoxy-1,2-O-isopropylidene-β-L-threopent-4-enofuranose was dissolved in 100 ml. of methanol and, after the addition of 2 g. of 5% palladium-charcoal was hydrogenated at room temperature. The reaction mixture was subsequently filtered and concentrated to dryness. The residue was suspended in ether and filtered. The filtrate was concentrated to dryness. There was obtained 3-O-acetyl-5-desoxy-1,2-O-isopropylidene-β-L-arabinofuranose, $[\alpha]_D^{25°} = +8.25°$; c.=1.915% (methanol).

47.1 g. of 3-O-acetyl-5-desoxy-1,2-O-isopropylidene-β-L-arabinofuranose was dissolved in 200 ml. of absolute methanol and treated in a round flask with 10 ml. of 0.1 N methanolic sodium methylate solution. The flask was sealed and allowed to stand at room temperature. After 5 hours, the reaction mixture was treated with Amberlite IR 120 (H+-form, washed with excess methanol). The mixture was stirred until neutral and subsequently filtered. The filter residue was rinsed with methanol and the combined filtrates were concentrated to dryness. The residual 5-desoxy-1,2-O-isopropylidene-β-L-arabinofuranose crystallized at room temperature. The crystals were triturated with ether/petroleum ether (low-boiling) (7:3), filtered, rinsed with ether/petroleum ether 7:3 and subsequently with petroleum ether (low-boiling). The compound thus obtained melted at 80–82° after drying under reduced pressure.

Additional 5-desoxy-1,2-O-isopropylidene-β-L-arabinose was recovered in the same manner from the mother liquor, M.P. 78–80°.

$[\alpha]_D^{25°} = -10.8°$; c.=0.297% (methanol).

*Analysis.*—Calcd. for $C_8H_{14}O_4$ (percent): C, 55.16; H, 8.10. Found (percent): C, 55.17; H, 7.94.

The 3-O-acetyl-5-desoxy-1,2-O-isopropylidene-β-L-threo-pent-4-enofuranose used as the starting material was prepared as follows:

50 g. of 1,2:5,6-di-O-isopropylidene-α-D-glucofuranose (manufactured by treating α-D-glucose with acetone in the presence of sulfuric acid) was suspended in 1500 ml. of water and treated with stirring with 0.5 g. of copper (II) acetate. The solution was heated under reflux conditions for about 5 hours. After a reflux time of half an hour, a sample (ca. 2 ml.) was evaporated to dryness under reduced pressure. When the residue melted at 153–154° C., the boiling process was terminated. The reaction mixture was thereupon treated with stirring with ca. 2 g. of active charcoal, stirred for a few minutes, filtered and evaporated to dryness under reduced pressure. The product was dried to constant weight under reduced pressure at 40–50° C. 1,2-O-isopropylidene-α-D-glucofuranose was obtained as a grey-green colored crystal mass which melted at 153–154° C.

22.0 g. of 1,2 - isopropylidene - α-D-glucofuranose was suspended in 100 ml. of glacial acetic acid and treated in the course of 15–20 minutes with stirring with 50 g. of lead tetraacetate. The exothermic reaction which commenced was kept at a temperature of 40° C. by cooling. After completion of the reaction, the reaction mixture was further stirred for about 1 additional hour. The slightly turbid solution obtained was evaporated at ca. 40° C. The residue obtained was taken up in a little water and extracted twice with 150 ml. of ethyl acetate. The combined solutions were washed neutral with sodium bicarbonate solution, dried over sodium sulfate and evaporated. There was obtained a white amorphous oxidation product which was directly employed for the next step.

90.0 g. of the amorphous oxidation product obtained above was dissolved in a mixture of 750 ml. of ethanol and 250 ml. of water and hydrogenated with 25 g. of Raney-nickel at 100° C. and 60 atm. for 3 hours. The catalyst was filtered off. The filtrate was evaporated under reduced pressure at 40° C. The residue, a colorless syrup, was distilled under reduced pressure. There was obtained 1,2 - O - isopropylidene-α-D-xylofuranose which boiled at 155–160°/0.03 mm.

*Analysis.*—Calcd. for $C_8H_{14}O_5$ (percent): C, 50.52; H, 7.42. Found (percent): C, 50.53; H, 7.42.

6.0 g. of 1,2-O-isopropylidene-α-D-xylofuranose was dissolved in 50 ml. of absolute pyridine and, with ice-cooling and stirring, treated dropwise within 30 minutes with a solution of 6.2 g. of p-toluenesulfonyl chloride in 25 ml. of absolute benzene. After standing for 12 hours at room temperature, the major part of the pyridine was distilled off at 35–40° C. The residue was treated with 150–200 ml. of water and vigorously shaken for 15–20 minutes. The white crystals which precipitated were filtered off and washed with cold distilled water until they were pyridine-free, subsequently dried under reduce pressure at 40° C. and thereafter recrystallized from ethyl acetate/petroleum ether. There was obtained 1,2-O-isopropylidene-5-O-tosyl-α-D-xylofuranose which melted at 135–136° C.

*Analysis.*—Calcd. for $C_{15}H_{20}O_7S$ (percent): C, 52.32; H, 5.83; S, 9.31. Found (percent): C, 52.39; H, 5.97; S, 9.25.

100 g. of 1,2-isipropylidene-5-O-tosyl-α-D-xylofuranose was dissolved in 650 ml. of absolute pyridine and, with exclusion of moisture, treated dropwise with 92.5 ml. of acetic acid anhydride within 15 minutes. The temperature transiently rose to 28° C., but after a further 15 minutes fell to 25° C. The reaction mixture was stirred at room temperature for 12 hours, and was then concentrated to dryness. The residue was dissolved in 200 ml. of methylene chloride, treated with ca. 300 ml. of ice-water and stirred for half an hour. The organic phase was subsequently washed with 3 N hydrochloric acid, sodium bicarbonate solution, dried over sodium sulfate and filtered. The filtrate was concentrated to dryness and the residue was dried at 80° C. under reduced pressure. There was obtained 3-O-acetyl - 1,2 - O - isopropylidene-5-O-tosyl-α-D-xylofuranose which behaved uniformly on the thin layer chromatogram (kieselgel; petroleum ether/acetone 7:3); $[α]_D^{25°}=-19.8°$; c.=1.38 (chloroform).

*Analysis.*—Calcd. for $C_{17}H_{22}O_8S$ (percent): C, 52.84; H, 5.74; S, 8.30. Found (percent): C, 52.90; H, 5.76; S, 8.19.

The product was further processed without further purification.

A solution of 112.1 g. of 3-O-acetyl-1,2-O-isopropylidene-5-O-tosyl-α-D-xylofuranose in 1700 ml. of methyl propyl ketone was treated with 167 g. of sodium iodide. The mixture was heated to reflux with stirring for 16 hours. The reaction mixture was subsequently concentrated to dryness and the residue extracted with ca. 3000 ml. of benzene. The benzene extract was filtered and the filtrate was concentrated. The crude 3-O-acetyl-5-desoxy-5 - iodo-1,2-isopropylidene-α-D-xylofuranose obtained was purified by adsorption on a 20-fold amount of kieselgel (0.2–0.5 mm.) (eluting agent benzene/ether 9:1).

The pure 3-O-acetyl-5-desoxy-4-iodo-1,2-O-isopropylidene-α-O-xylofuranose obtained melted at 62° C.; $[α]_D^{25°}=-46.7°$; c.=1.7 (chloroform).

*Analysis.*—Calcd. for $C_{10}H_{15}O_5I$ (percent): C, 35.11; H, 4.42. Found (percent): C, 35.59; H, 4.56.

75.3 g. of 3-O-acetyl-5-desoxy-5-iodo-1,2-O-isopropylidene-α-D-xylofuranose, 90.5 g. of finely divided silver fluoride and 750 ml. of pyridine (dried over barium oxide) were shaken together in a sealed vessel with exclusion of light for 16 hours. The reaction mixture was poured, with stirring, into about 2500 ml. of ether and treated with active charcoal. After stirring for half an hour, the mixture was filtered, the filtrate was washed with ice-cold 3 N hydrochloric acid and subsequently with sodium bicarbonate solution. The solution was dried over sodium sulfate, filtered and concentrated to dryness. The residual 3-O-acetyl - 5 - desoxy-1,2-O-isopropylidene-β-L-threo-pent-4-enofuranose, a colorless liquid, was purified by distillation at 80° C./0.05 mm. $n_D^{23°}=1.4548$; $[α]_D^{25°}=+18.3$; c.=0.45% (chloroform).

*Analysis.*—Calcd. for $C_{10}H_{14}O_5$ (percent): C, 56.07; H, 6.59. Found (percent): C, 56.08; H, 6.59.

EXAMPLE 2

42.2 g. of 5-desoxy-1,2-O-isopropylidene-β-L-arabinose was suspended in 1000 ml. of 10% acetic acid and heated on a steam-bath for 1½ hours. The reaction mixture was subsequently concentrated to dryness. The residue was repeatedly suspended with methanol/benzene 1:1 and in each case concentrated. The residue was dried at 60° C. under reduced pressure. The 5-desoxy-L-arabinose obtained, a yellowish oil, was purified by adsorption on a 20-fold amount of kieselgel 0.2–0.5 mm. (eluting agent: chloroform/methanol 9:1). The 1-liter fractions, uniform by thin layer chromatogram, were combined and dried at 60° C. under reduced pressure. There was obtained pure 5-desoxy-L-arabinose; $[α]_D^{25°}=-38.8°$; c.=0.294% (ethanol). $R_1=0.63$ (Whatman paper; n-butanol:glacial acetic:water 50:15:35).

EXAMPLE 3

19.1 g. of 5-desoxy-1,2-O-isopropylidene-3-O-(tetrahydropyran-2-yl)-β-L-threo-pent-4-enofuranose in 500 ml. of methanol was treated with 1.5 g. of 5% palladium-charcoal and hydrogenated at room temperature. After complete hydrogen uptake, the reaction mixture was filtered and the filtrate residue was rinsed with methanol. The filtrate was concentrated to dryness affording a crystalline residue which was suspended with ether/petroleum ether 3:7. The suspension was filtered and washed with ether/petroleum ether 3:7 and subsequently with petroleum ether. The 5 - desoxy-1,2-O-isopropylidene-β-L-arabinofuranose thus obtained melted at 78–80° C.

$$[α]_D^{25°}=-12.58°$$

c.=0.183% (methanol).

*Analysis.*—Calcd. for $C_8H_{14}O_4$ (percent): C, 55.16; H, 8.10. Found (percent): C, 55.20; H, 8.12.

Crystalline 5-desoxy-1,2-O-isopropylidene-β-L-arabinofuranose was recovered from the mother liquor in the same manner as described above.

The 5-desoxy - 1,2 - O - isopropylidene-3-O-(tetrahydropyran-2-yl)-β-L-threo-pent-4-enofuranose employed as the starting material was manufactured as follows:

38.8 g. of 1,2 - O - isopropylidene - 5 - O - tosyl - D-xylofuranose was covered with 1300 ml. of absolute benzene and brought into solution by heating on a steam-bath. The solution was treated with 40 ml. of dihydropyran (distilled over sodium) and 0.4 g. of p-toluenesulfonic acid monohydrate and heated for 10 minutes. After cooling, the mixture was neutralized with sodium bicarbonate solution. The benzene solution was dried over sodium sulfate, filtered and concentrated to dryness. The residue was dissolved in about 200 ml. of warm glacial acetic, treated with petroleum ether (low-boiling) up to incipient turbidity and cooled to room temperature. After standing in the cold for an hour, the crystals formed were filtered off, washed with petroleum ether (low-boiling)/ethyl acetate 1:4 and subsequently with petroleum ether and dried under reduced pressure at 40–45° C. The 1,2 - O - isopropylidene - 3 - O - (tetrahydropyran - 2 - yl) - 5 - O - tosyl - α - D - xylofuranose obtained melted at 87–89° C.

*Analysis.*—Calcd. for $C_{20}H_{28}O_8S$ (percent): C, 56.06; H, 6.59; S, 7.48. Found (percent): C, 55.97; H, 6.52; S, 7.28.

A mixture of 50 g. of 1,2-O-isopropylidene-3-O-(tetrahydropyran - 2 - yl) - 5 - O - tosyl - α - D - xylofuranose, 500 ml. of absolute pyridine (dried over barium oxide) 500 ml. of tert. butanol and 65 g. of potassium tert. butylate was shaken for 16 hours with exclusion of air. The reaction mixture was subsequently poured into 2000 ml. of ethanol and, with stirring, neutralized by introduction of carbon dioxide gas (duration about 1 hour). The mixture was subsequently concentrated to dryness. The residue was dissolved in about 1000 ml. of water and extracted three times with 500 ml. of ether. The combined ether extracts were washed with ice-cold 3 N hydrochloric acid and subsequently with sodium bicarbonate solution. The ether solution was dried over sodium sulfate, filtered and concentrated to dryness. The crude 5-desoxy-1,2-O-isopropylidene - 3 - O - (tetrahydropyran - 2 - yl) - β - L-threo-pent-4-enofuranose obtained was purified by adsorption on a 20-fold amount of kieselgel (0.2–0.5 mm.) (eluting agent: benzene/acetic ester 95:5).

*Analysis.*—Calcd. for $C_{13}H_{20}O_5$ (percent): C, 60.92; H, 7.87. Found (percent): C, 61.19; H, 8.09.

I claim:
1. The compound of the formula

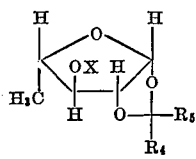

where X is hydrogen, lower alkyl, lower cycloalkyl, phenyl lower alkyl, lower alkanoyl, phenyl lower alkanoyl or the group $R_1OCR_2R_3$— wherein $R_1$ independently is lower alkyl, lower cycloalkyl or phenyl lower alkyl, $R_2$ independently is hydrogen, lower alkyl, lower cycloalkyl or phenyl lower alkyl, and $R_1$ and $R_2$ taken together are lower alkylene; $R_3$ is hydrogen, lower alkyl or lower cycloalkyl, and $R_4$ and $R_5$ each independently are hydrogen, lower alkyl, lower cycloalkyl or phenyl lower alkyl or taken together are lower alkylene.

2. The compound of claim 1 which is 3-O-acetyl-5-desoxy-1,2-O-isopropylidene-β-L-arabinofuranose.

3. The compound of claim 1 which is 5-desoxy-1,2-O-isopropylidene-β-L-arabinofuranose.

4. The compound of the formula

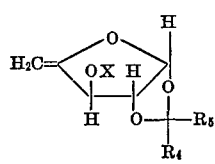

where X is hydrogen, lower alkyl, lower cycloalkyl, phenyl lower alkyl or the group $R_1OCR_2R_3$— wherein $R_1$ independently is lower alkyl, lower cycloalkyl or phenyl lower alkyl, $R_2$ independently is hydrogen, lower alkyl, lower cycloalkyl or phenyl lower alkyl, and $R_1$ and $R_2$ taken together are lower alkylene; $R_3$ is hydrogen, lower alkyl or lower cycloalkyl, and $R_4$ and $R_5$ each independently are hydrogen, lower alkyl, lower cycloalkyl or phenyl lower alkyl or taken together are lower alkylene.

5. The compound of claim 4 which is 5-desoxy-1,2-O-isopropylidene - 3 - O - (tetrahydropyran - 2 - yl) - β-L-threo-pent-4-enofuranose.

6. The compound of the formula

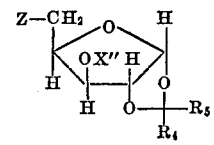

where Z is bromine or iodine, X″ is lower alkanoyl or phenyl lower alkanoyl and $R_4$ and $R_5$ each independently are hydrogen, lower alkyl, lower cycloalkyl or phenyl lower alkyl or taken together are lower alkylene.

7. The compound of the formula

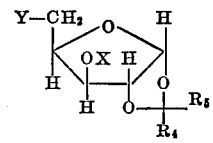

where Y is a substituted sulfonyloxy group, X is hydrogen, lower alkyl, lower cycloalkyl, phenyl lower alkyl, lower alkanoyl, phenyl lower alkanoyl or the group $$R_1OCR_2R_3—$$

wherein $R_1$ independently is lower alkyl, lower cycloalkyl or phenyl lower alkyl, $R_2$ independently is hydrogen, lower alkyl, lower cycloalkyl or phenyl lower alkyl, and $R_1$ and $R_2$ taken together are lower alkylene; $R_3$ is hydrogen, lower alkyl or lower cycloalkyl, and $R_4$ and $R_5$ each independently are hydrogen, lower alkyl, lower cycloalkyl or phenyl lower alkyl or taken together are lower alkylene.

8. The compound of the formula

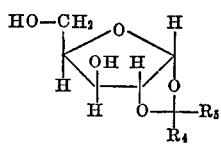

where $R_4$ and $R_5$ each independently are hydrogen, lower alkyl, lower cycloalkyl or phenyl lower alkyl or taken together are lower alkylene.

9. The compound of the formula

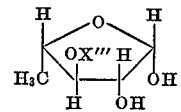

where X‴ is lower alkyl, lower cycloalkyl or phenyl lower alkyl.

10. A process for the preparation of 5-desoxy-L-arabinose which comprises in combination
(a) catalytically hydrogenating a compound of the formula

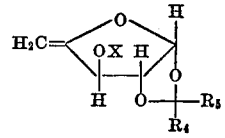

where X is hydrogen, lower alkyl, lower cycloalkyl, phenyl lower alkyl, lower alkanoyl, phenyl lower alkanoyl or the group $R_1OCR_2R_3$— wherein $R_1$ independently is lower alkyl, lower cycloalkyl or phenyl lower alkyl, $R_2$ independently is hydrogen, lower alkyl, lower cycloalkyl or phenyl lower alkyl, and $R_1$ and $R_2$ taken together are lower alkylene, $R_3$ is hydrogen, lower alkyl or lower cycloalkyl, and $R_4$ and $R_5$ each independently are hydrogen, lower alkyl, lower cycloalkyl, or phenyl lower alkyl or taken together are lower alkylene to afford a compound of the formula

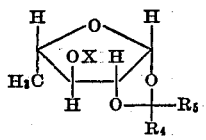

where X, $R_4$, and $R_5$ are as above, and
(b) hydrolyzing any protective group present in the product from step (a).

11. A process as in claim 10 where palladium-charcoal is employed as the hydrogenation catalyst.

12. A process as in claim 10 where X is benzyl, substituted benzyl, or the group $R_1OCR_2R_3$— where $R_1$, $R_2$ and $R_3$ are as in claim 10, where the protective group X is hydrogenolyzed by continuing the hydrogenation past the uptake of one mole-equivalent of hydrogen.

13. A process as in claim 10 where X is lower alkanoyl or phenyl lower alkanoyl, wherein the protective group X is first hydrolyzed by treating with an alkali metal hydroxide or alcoholate and the 1,2-O ketal is then hydrolyzed by treating with an acidic agent.

14. A process as in claim 10 where X is lower alkyl, lower cycloalkyl or phenyl lower alkyl, wherein the 1,2-O ketal is first hydrolyzed by treating with a dilute mineral acid under mild conditions or with a lower alkane carboxylic acid and the protective group X is then hydrolyzed by treating with a dilute mineral acid under vigorous conditions.

References Cited

Wolfrom et al.: "Advances in Carbohydrate Chemistry and Biochemistry," vol. 24, 1969, Academic Press, New York, pp. 250–251.

LEWIS GOTTS, Primary Examiner

J. R. BROWN, Assistant Examiner

UNITED STATES PATENT OFFICE
CERTIFICATE OF CORRECTION

Patent No. 3,699,103      Dated October 17, 1972

Inventor(s) Joseph Kiss

It is certified that error appears in the above-identified patent and that said Letters Patent are hereby corrected as shown below:

Please include priority claim as follows:

"Switzerland -- 15905/69"

October 24, 1969

Signed and sealed this 22nd day of May 1973.

(SEAL)
Attest:

EDWARD M. FLETCHER, JR.
Attesting Officer

ROBERT GOTTSCHALK
Commissioner of Patents